United States Patent [19]
Levin

[11] 3,742,001
[45] June 26, 1973

[54] RENDERING PROCESS
[75] Inventor: Ezra Levin, Champaign, Ill.
[73] Assignee: VioBin Corporation, Champaign, Ill.
[22] Filed: June 29, 1970
[21] Appl. No.: 50,828

Related U.S. Application Data
[63] Continuation-in-part of Ser. No. 408,231, Nov. 2, 1964, Pat. No. 3,538,973.

[52] U.S. Cl............................ 260/412.8, 260/412.6
[51] Int. Cl.............................................. C11b 1/10
[58] Field of Search....................... 260/412.8, 412.6

[56] References Cited
UNITED STATES PATENTS
2,665,198   1/1954   Harcourt............................. 260/412.8
2,742,488   4/1956   Dufault.............................. 260/412.8
3,006,938   10/1961  West et al.......................... 260/412.8
3,025,315   3/1962   Krumm et al....................... 260/412.6
3,170,767   2/1965   Wistreich........................... 260/412.8
3,297,731   1/1967   Hale et al. ........................ 260/412.8
3,538,973   11/1970  Levin................................. 260/412.8

Primary Examiner—Lewis Gotts
Assistant Examiner—Johnnie R. Brown
Attorney—Burmeister, Palmatier and Hamby

[57] ABSTRACT

The process reduces the water content of a biological tissue, in particle form and retaining a fat content by coagulating the particles, and thereafter contacting the particles with a gas at an elevated temperature and having a water vapor pressure, at the temperature to which the gas raises the biological tissue, that is less than the vapor pressure of water contained in the tissue at that temperature. Subsequently, the at least partially dehydrated biological particles are extracted. In one embodiment of the invention the extraction is accomplished by warm polar type fat solvent, and in another embodiment of the invention partially dehydrated particles are introduced into a water-immiscible, fat, solvent, and by azeotropic distillation of water and solvent the water content is further reduced and by extraction the fat content is reduced. The process is preferably performed in a continuous manner by utilizing specific apparatus. The dehydrated, defatted product is treated for solvent removal.

22 Claims, 7 Drawing Figures

Inventor
Ezra Levin
By Burmeister, Palmatier & Hamby
Attorneys

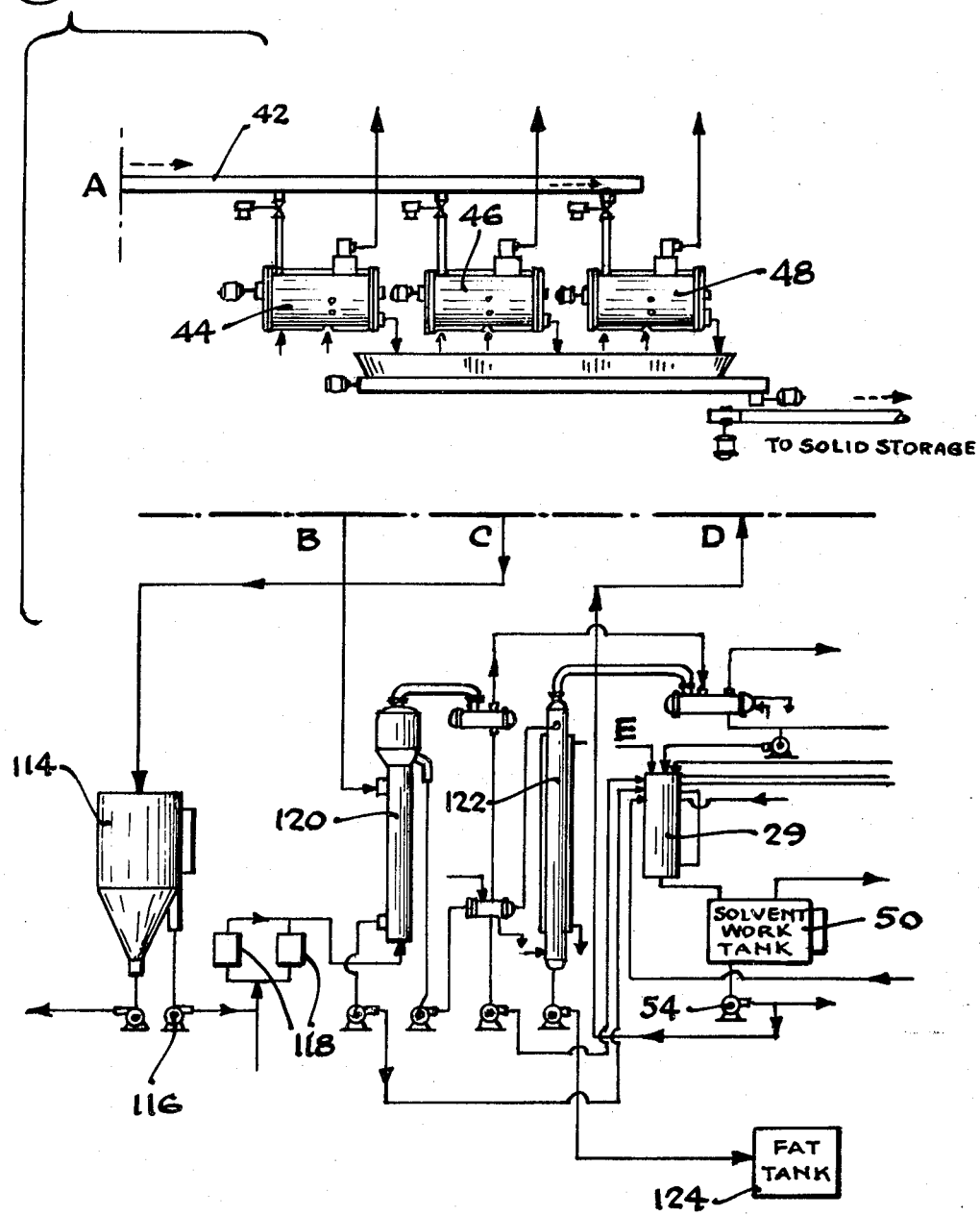

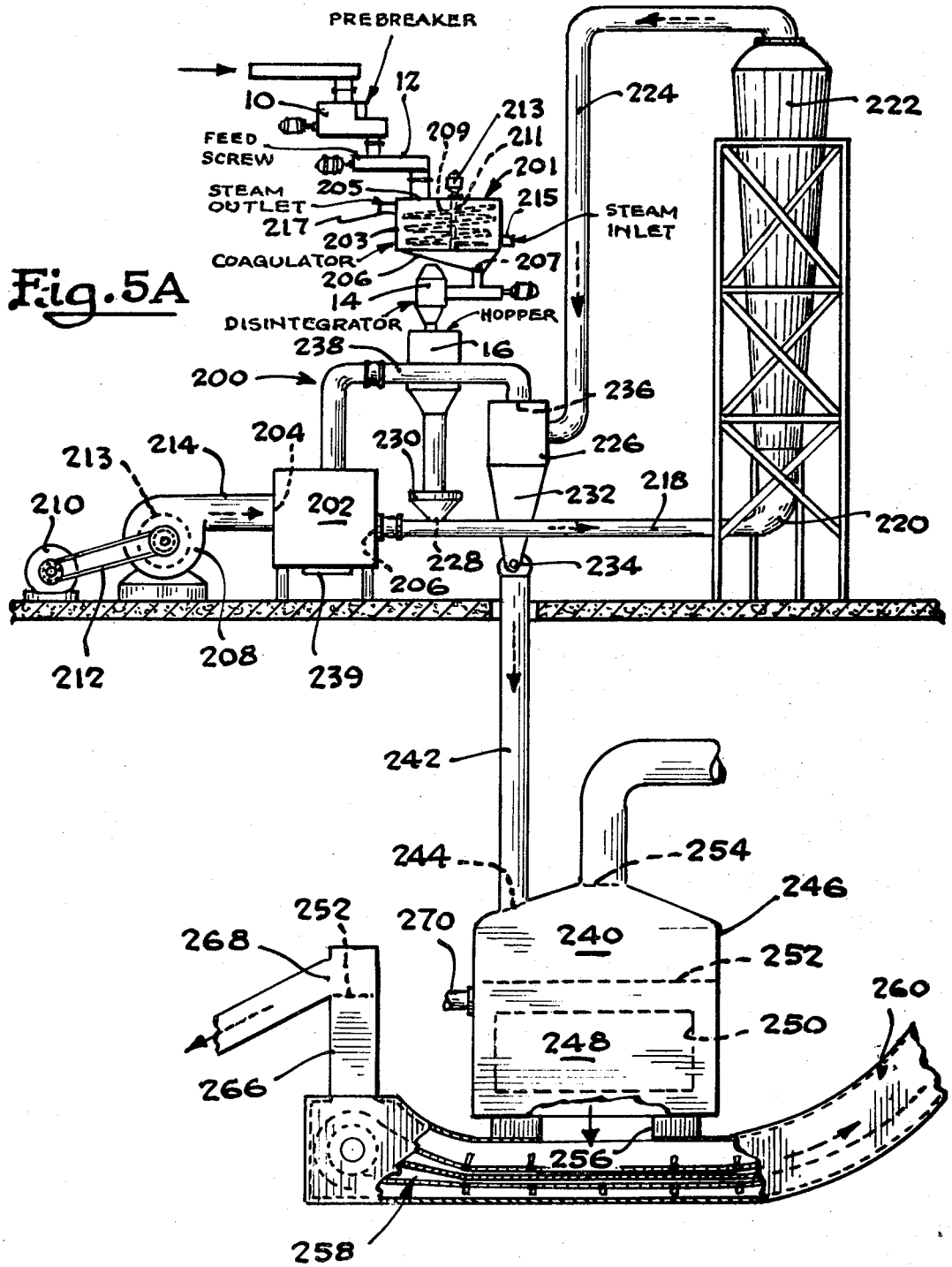

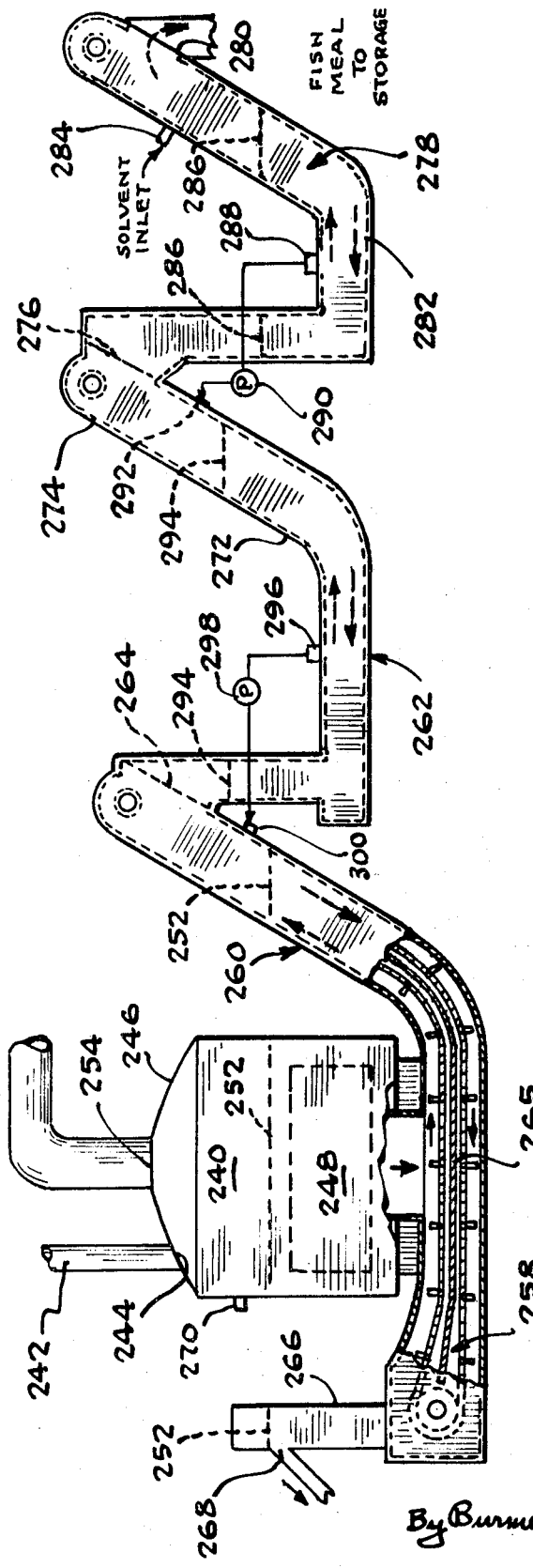

RENDERING PROCESS

CROSS REFERENCE TO RELATED APPLICATION

This application is a continuation-in-part of applicant's copending application Ser. No. 408,231, filed Nov. 2, 1964, now U.S. Pat. No. 3,538,973, patented Nov. 10, 1970.

BACKGROUND OF THE INVENTION

1. Field of the Invention

This invention relates to a process and to an apparatus, the latter being useful for carrying out the process in a continuous manner to the point of producing a product that by desolventizing results in a useful defatted and dehydrated product from a biological tissue, having a fat content and having a water content that is very substantial. The water content usually constitutes a major proportion of the tissue that is treated.

2. Description of the Prior Art

It is known by virtue of my U.S. Pat. No. 2,619,425 that biological tissues can be treated to remove a substantial part of their fat content to obtain desirable proteinaceous materials. My process described and claimed in that patent obtains a defatting of a biological substance and obtains a drying of the substance by an azeotropic distillation of water and solvent. A water-immiscible fat solvent is used and the temperature during the dehydrating and drying operations is maintained at a temperature below 100° C. The patent describes an improvement in such process. The improvement is obtained by converting the biological substance to a form in which it is pumpable as a fluid and the latter is introduced as droplets into a boiling body of the solvent. A variation of this process is disclosed in U.S. Pat. No. 2,503,312 entitled "SIMULTANEOUS DEFATTING AND DEHYDRATING OF FATTY SUBSTANCES" of the present inventor and Everett M. Worsham which describes coagulation of particles prior to introduction into a boiling body of solvent. When sufficient water has been removed as an azeotrope of water and the solvent, a substantial part of the fat content of the biological substance is extracted by the solvent. The fat-containing solvent is separated from the defatted and dehydrated biological substance. After washing the substance with fresh solvent, the substance is treated for removal of adsorbed solvent, such as by evaporation.

It has also been known that plant materials can be dried by the use of heat and moving gas vapors, such as described in U.S. Pat. No. 1,676,786 by Lissauer entitled "Dryer Control," and flash drying systems have been used for drying wood pulp and removing solvent from soybean flakes as described by Brekke, Mustakas, Roether, and Griffin in "The Journal of the American Oil Chemist's Society," June 1959 Issue, Vol. XXXVI No. 6, pp. 256–260.

The invention relates to an improvement in the process of dehydrating and defatting animal tissues, that is tissues containing large fat content as well as moisture. The process is applicable particularly to dehydrating and defatting particles of fish and meat. The process treats particles of animal tissue which contain both high fat and moisture to remove a significant part of the moisture rapidly, that is before significant deterioration of the biological values can occur, and the process does so by coagulating the particles to be treated and then contacting the particles with a gas at a temperature sufficiently elevated to heat the particles to a temperature at which water in the particles has a substantial vapor pressure. In a preferred construction, the coagulated particles are contacted with the hot gas while suspended in a rapidly moving mass of the gas to prevent the particles from contacting hot surfaces to which the particles tend to adhere.

The invention requires the removal of fat from the dehydrated particles, and this is accomplished by solvent extraction. In one embodiment of the invention, extraction is accomplished by conventional apparatus, preferably using a polar type solvent.

Further, this invention relates to an improvement in the process described and claimed in my U.S. Pat. No. 2,619,425. The improved process is applicable for the treatment of those biological substances that have a substantial water content that require a relatively long time to reduce water content sufficiently by azeotropic distillation to be able to solvent extract fat from such biological substances. In another embodiment of the invention, the improved overall process uses azeotropic distillation without a substantial increase in time for the azeotropic distillation, as compared with the time used for substantial dehydration of other biological substances having substantially lower initial water content.

The process is applicable to a batch operation for such azeotropic distillation. However, the process of the present invention is most advantageously performed as an overall process that is continuous except for desolventizing of the defatted product. In the latter case, it utilizes, with a modification described below, the process that is described and claimed along with an improved apparatus in my United States patent application Ser. No. 408,231, filed on Nov. 2, 1964, now U.S. Pat. No. 3,538,973 patented Nov. 10, 1970, and entitled "CONTINUOUS RENDERING PROCESS AND APPARATUS." The apparatus of the present invention is a modification of the apparatus of said copending patent application.

The present process treats biological substance having substantial water and fat content, such as animal tissue derived from cattle, hogs, and fish. In those biological substances, the substantial water content is at least 40 percent by weight of the biological substance and usually more than 60 percent by weight. In some cases, the water content may be as high as 85 percent or greater.

The present inventor and his coinventor stated in U.S. Pat. No. 2,503,312, that they had observed "in the solvent extraction of animal tissues by most conventional means that solvent in successive stages seems to continue to remove oil from the tissue although at a reduced rate after the first washes," and they further state that the rapid and complete removal of fat from the tissue may be achieved by the initial distillation of water and solvent from the substance in accordance with their invention. The inventor has found that it is the presence of large amounts of water in the tissue which limits the extraction of fat from the tissue, but at the same time the presence of substantial fat makes difficult the removal of the water from the tissue. Wet animal tissue particles are sticky and tend to agglomerate, thus greatly impeding water removal. Further, the presence of fat as such tends to bind the water to the particles. The inventor has found, however, that water may be at least partially removed advantageously prior to extraction as described hereinafter.

The present process treats such biological substance by converting it to particles, such as by a prebreaker, coagulating the particles, and then passing over the surface of the particles a gas having a temperature sufficiently elevated to heat the particles to a temperature at which water in the particle has a substantial vapor pressure. The gas has a composition such that water vapor from the substance is transferred to the gas. Thus, the gas being passed over the particles removes water from the particles and that water as vapor constituting a part of the changed gas composition provides a partial drying of the particles.

Unless the particles are coagulated before introducing the particles into a vessel in which they are suspended in the hot gas, the particles will tend to stick on any surface they may contact or to conglomerate together. Coagulation is achieved by heating the particles after grinding to a temperature of about 60° C to 100° C and maintaining this temperature for a sufficient period to coagulate the albumen like protein present in the tissue. Coagulation may be achieved by use of a skillet, but is preferably achieved continuously be means of heating the particles in a vessel, preferably by steam in direct contact with the particles although hot air or other gases may be used. The vessel is preferably provided with a stirring device. Coagulation may be achieved in such a vessel in a comparatively short time, less than ten hours and preferably less than 2 hours.

Suitable gases for drying the particles while in suspension include superheated steam, alcohol vapor, and preferably heated air. In the case of superheated steam, it is introduced to a zone or chamber containing the particles at lower gaseous pressure, preferably atmospheric pressure, and the gas is exhausted from the chamber. A preferred illustrative temperature for superheated steam is about 350° C. In the case of heated air, the air preferably contacts the particles at a greatly elevated temperature with respect to the particles, such as 600° F, but the particles themselves never exceed the temperature of the boiling point of water.

The time of contact between the particles and the hot gas is dependent upon various factors, namely, the initial water content, the reduction in water content desired for the particles by the gas drying step, the gas temperature, and the water vapor diffusion rate out of the particles. Simple experiment can determine optimum conditions to obtain the particular desired degree of drying by this gas treatment of the particles is chosen so that the particles of biological substance are heated to a maximum temperature sufficiently low to prevent destruction of the nutritional value of the particles, and for most purposes may result in maximum particle temperatures of about 212° F. At higher gas temperatures the particles need be treated for only a shorter period of time to reduce the water content, and the time must be limited to prevent excessive particle temperature which will not occur as long as the particles retain substantial moisture.

The drying step, described above, is advantageously capable of a continuous operation. In such case, the particles are moved through the zone and exit at a location other than the entrance or exit of the gas. The continuous operation may be advantageously carried out by suspending the particles in a flow of moving gas or by the use of a long screw conveyor in which the barrel defines the chamber and the flights of the rotating screw move the particles. In the latter case, the hot gas is introduced preferably at several places through the barrel wall and removed elsewhere through the wall.

The drying step is preferably carried out by continuously introducing the particles into a flow of hot air and permitting the flow to transport the particles to a settling area for continuous removal.

The gas drying step may be utilized to reduce the moisture content of animal tissue particles to a level permitting conventional solvent extraction of oils or to merely partially dry the particles. If the moisture content of animal tissue is reduced to 20 percent or less, it has been found that the oil or fat in the tissue may be directly removed by solvent extraction. However, prior to the present invention it has not been practical to reduce the moisture content of meat or fish to 20 percent or less due to particle agglomeration and sticking on the surfaces of the dehydration apparatus. After the particles have been dehydrated to a percentage of 20 percent or less, they may be economically and conventionally extracted by a conventional solvent, preferably, a polar type solvent such as alcohol, or ethylene dichloride, in conventional commercially available apparatus. Non-polar type solvents, such as hexane, can also be used in conventional extraction apparatus to remove oil bush such solvents are not as effective as a polar type solvent.

There are, however, advantages in gas drying the animal tissue particles and utilizing an azeotropic distillation process to reduce the moisture content to safe storage levels, particularly when the particles are dried to a percentage in excess of 20 percent. First, the temperature of the particles is maintained well below the boiling temperature of the moisture, thus preventing deterioration of temperature sensitive nutritional elements in the particles, such as methionine found in fish. Secondly, the mechanical specifications or the requirements for the gas drying system are materially reduced if final moisture need not be removed. In particular, control of particle size, gas flow rates and temperature become less critical. Thirdly, the economic advantage of gas drying decreases as the quantity of moisture in the particles becomes less, and at the same time the cost of removing a relatively small amount of moisture by azeotropic distillation is less per unit that removing large quantities of moisture. In addition, the removal of the final moisture from animal tissue by azeotropic distillation has the following advantages. First, azeotropic distillation assures removal of this moisture at a controllable low temperature. Second, at least partial defatting is accomplished simultaneously with dehydration. Third, the initial step in deodorizing of fish particles may be accomplished, namely removal of lipid materials.

This partial predrying step can reduce the water content to a limited extent without changing the fat and without producing sticky particles that would be difficult, if not impossible, to handle and transfer, especially in a continuous manner, from the predrying step to an azeotropic distillation step. The optimum lower limit on the water content to which the particles are reduced by the predrying is about 40 percent by weight of the partially dried particles, the "optimum lower limit" being defined as that water content of the tissue at which removal of water by predrying aquals in cost removal of water by azeotropic distillation. The optimum lower limit is directly related to the fat content of the particles. When the fat content is about 20 percent after predrying, the optimum lower limit is about 40 percent water, but for tissue having greater fat content, the optimum lower limit on water content which may be achieved is greater than 40 percent. Thus, fish containing 80 percent water and 10 percent fat and 10 percent solids, can be optimumly partially dried by this step of the present process to a substance containing about 40 percent water and about 30 percent fat and 30 percent solids.

The partially dried particles are fed to a body of a solvent that forms a relatively low temperature azeotrope with water, as described later in more detail, and further dehydrates and extracts fat from the particles being subsequently desolventized.

The continuous process of the present invention, because of the water content reduction of particles of the biological material, permits a substantially increased rate of treatment of biological material for a specific azeotropic distillation chamber or vessel. For example, by partial drying of the particles of fish containing about 80 percent water to particles containing about 40 percent water, the pounds of fish fed per hour to the apparatus of the invention is about double that fed to the apparatus of the invention described in my said copending United States patent application Ser. No. 408,231, now U.S. Pat. No. 3,538,973, and having the same equipment, except the latter lacks the predrier and thus feeds fish particles containing about 80 percent water to the azeotropic distillation chamber, described in that application and referred to later in this specification as a primary cooker.

It has been known that low fat tissue, such as hake fish, may be extracted by conventional means using alcohol as a solvent, and thereafter dehydrated. Predrying, according to the present invention, may be economically utilized with such processes even though the moisture content of the tissue exceeds 20 percent after predrying. Partial predrying prior to alcohol extraction facilitates extraction of fat and recovery of the oil from the extract, as well as increasing the production rate of such equipment.

BRIEF DESCRIPTION OF THE DRAWINGS

The invention, its objects and advantages, will be more thoroughly understood from the following specification and drawings, in which:

FIGS. 1 and 1A are a flow diagram for one embodiment of a plant for separating solids and fat from animal tissue;

FIGS. 5A and 5B are a longitudinal sectional view of another embodiment of the present invention, shown partly schematically.

DETAILED DESCRIPTION

Figure 1:
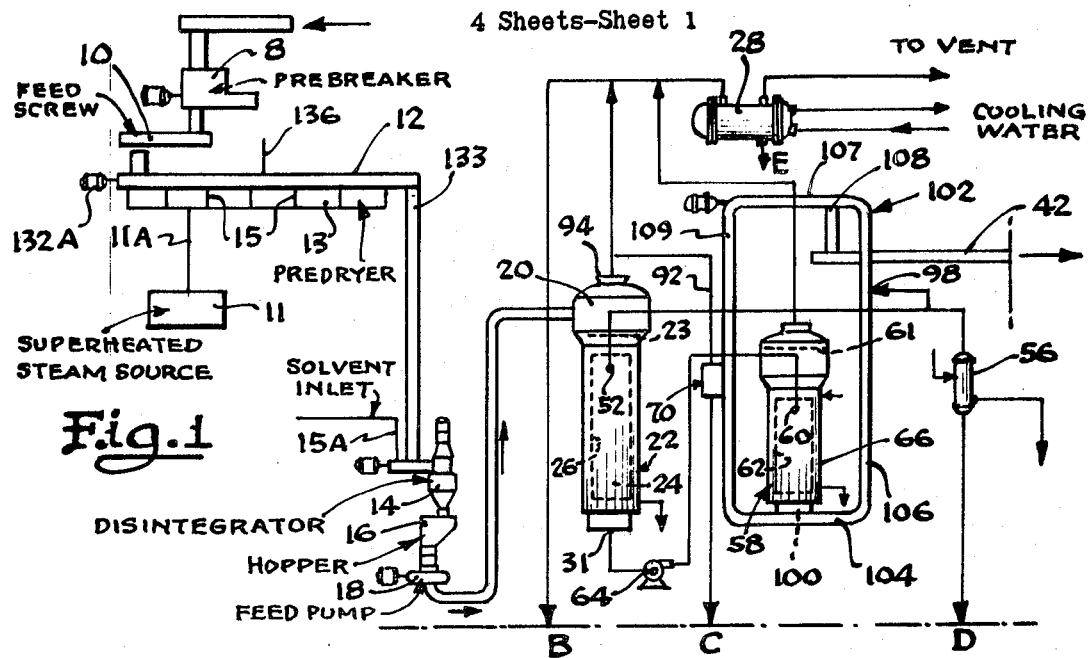

As indicated in FIG. 1, meat or fish tissue is transformed into a pumpable fluid by means of a prebreaker 8, feed-screw 10, predryer and coagulator 12, disintegrator 14, and hopper 16. The small particles of biological tissue are subjected to superheated steam which is introduced from a source 11 by a pipe 11A, manifold pipe 13 and pipes 15 into the predryer 12. Also, the particles of biological tissue after the partial drying in predryer 12 may be mixed with the solvent which is to be used in the process in the step of transforming the tissue into a pumpable fluid, and a solvent inlet 15A to the disintegrator 14 is illustrated for this purpose. The predryer and coagulator 12 is described later in more detail in connection with FIG. 4.

A feed pump 18 is then utilized to pump the pumpable particles into the upper portion or head 20 of the cooker 22. The cooker 22 is a vertically disposed elongated vessel with the head 20 positioned at the top thereof. A body of substantially water-immiscible fat solvent is disposed within the cooker below the head thereof. The body of solvent, designated 24, partially fills the cooker 22 as indicated by the level line 23, and the solvent forms an azeotrope with water preferably boiling substantially below 100° centigrade at atmospheric pressure. The solvent should be selected to form an azeotrope which will remove substantial portions of water in relation to the amount of solvent distilled at the operating temperature selected. Among solvents of this class, ethylene dichloride is a preferred solvent. Ethylene dichloride has a boiling point at atmospheric pressure of 83° C, and a water-ethylene dichloride azeotrope boils at 71.5° C. Another example of a particularly suitable solvent is heptane which boils at 98.4° C at atmospheric pressure. A water-heptane azeotrope boils at 79.5° C under atmospheric conditions. Other suitable solvents include propylene dichloride, trichlorethylene, perchlorethylene, and other low boiling chlorinated solvents. Suitable chlorinated solvents may include the bromine, iodine or fluorine derivatives of aliphatic hydrocarbons. In general, a suitable solvent must boil below 120° C under standard conditions. The hydrocarbon fat solvents including benzene, hexane, toluene, cyclohexane, heptane, and others are suitable. The solvent must not be reactive with the tissue constituents under operating conditions and must be capable of being removed by evaporation from the fat without leaving harmful or toxic residues.

Valuable properties of the solid particles recovered when some of the biological substances are treated by the process of the present invention will be lost if the tissue particles are subjected to elevated temperatures. For this reason, the solvent is preferably selected to boil at a sufficiently low temperature below about 93° C. However, if the process is being operated solely for fat rendering, it is not necessary to maintain a low operating temperature.

The moist particles of biological tissue are continuously introduced into the boiling solvent within the cooker 22, by spraying the coagulated and ground partially dried particles into the solvent adjacent to the upper level thereof. In certain instances, it is advantageous to pump an emulsion or mixture of the particles with the solvent used in the cooker 22 into the cooker so that the biological substances will form droplets. The particles are further dehydrated and substantially defatted in the cooker 22, but the particles may remain partially wet due to the fact that partially dried tissue particles are continuously introduced, and the cooker will not be capable of flash drying the particles as they enter the boiling solvent slurry. The particles of biological substances within the cooker 22 do become heavier than the solvent due to substantial drying, however, and tend to settle toward the bottom of the cooker 22 in spite of the violent boiling of the solvent.

As indicated in FIG. 1, the cooker 22 is provided with an internal heater 26 which utilizes low pressure steam as a heat source in order to maintain the body 24 of solvent under rapid boiling conditions. Vapor from the body 24 of solvent rises through the head 20 of the cooker and is conducted to a condenser 28 which is provided with a flow of cool water. Both the solvent and the water vapor are condensed to liquid form, and the solvent and water vapor are separated by a decanter 29, as is well known in the art. The water vapor is discarded and the recovered solvent returned to the system.

Granules formed from the biological tissue in the cooker 22 settle through the boiling body 24 of solvent, and pass through an opening 31 at the bottom of the cooker 22.

A relatively large quantity of solvent is maintained in storage in a work tank 50, and this solvent is continuously introduced into a port 52 located near the upper level of the boiling body 24 of solvent in the cooker 22. A pump 54 and solvent heater 56 are connected in the path between the solvent work tank 50 and the port 52 to provide an adequate supply of heated solvent to the cooker 22 to maintain the level 23 of the body 24 of solvent within the cooker.

Operation of the cooker 22 results in the body 24 becoming a slurry of solvent, granules of partially dried and defatted tissue, and fat which has been extracted from the tissue. Since, in equilibrium, the partially dried tissue continuously introduced into the cooker 22 brings with it the same amount of water being evaporated from the vessel, and hence the tissue leaving the vessel will have little moisture therein.

The slurry which is formed in the cooker 22 is continuously introduced into a second vessel or washer 58 through a port 60 located in the washer 58 near the level 61 of a body 62 of slurry from the cooker 22 disposed in the washer 58. A pump 64 located between the bottom opening 31 of the cooker 22 and the washer 58 maintains the body 62 at a relatively fixed level above the port 60, designated 61. A heater 66 located within the secondary cooker 58 maintains the body 62 under desired temperature conditions for extraction, but need not maintain a boiling temperature.

The washer 58 is also provided with an opening 100 at the bottom thereof, and a run-around conveyor 102 passes beneath the washer 58. The conveyor 102 has a horizontal leg 104 extending below the washer 58, a rising leg 106, an upper horizontal leg 107 and a down leg 109. The horizontal leg 107 contains an opening 108 for depositing dried granular meal into a horizontal conveyor 42. The horizontal conveyor transports the particles to one of a plurality of desolventizers 44, 46 or 48. The desolventizers are operated in sequence on the batch system. The particles passing through the opening 100 are defatted and substantially dry, but may carry occluded fat. The occluded fat is washed from the particles by a flow of clean solvent introduced into the leg 106 of the conveyor 30 in the upper portion thereof through a port 98. This flow of clean solvent also extracts fat from the particles. A portion of the solvent flowing from the solvent work tank 50 through the solvent pump 54 is used for this purpose. In this manner, the granular solid particles passing through the opening 108 to the horizontal conveyor 42 have a very low fat content.

As described above, all of the particles in the conveyor 42 are of low fat content, but contain some moisture. This moisture is removed with the solvent in the desolventizers 44, 46 and 48 to produce a solid product which is granular and contains very little moisture or fat, and hence has great stability.

A miscella outlet port 112 in communication with the washer 58 is provided in the leg 109 of the run-around conveyor 102. The construction of this outlet port 112 includes a filter 70 and is best illustrated in FIGS. 2 and 3.

Figure 2:
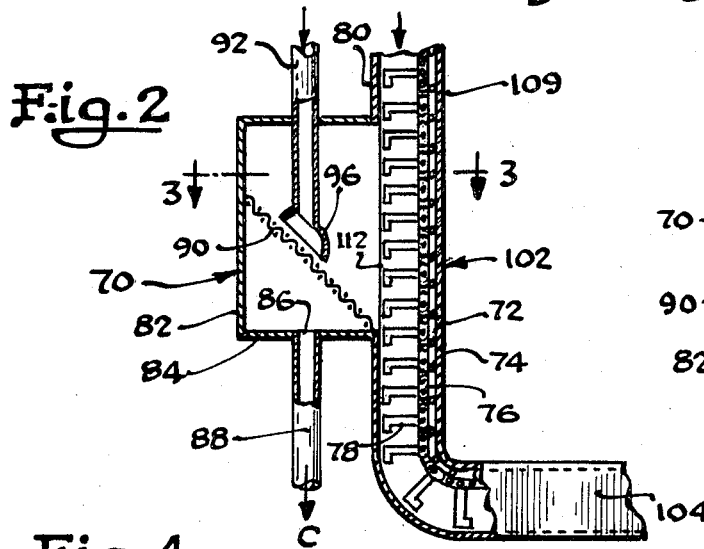
FIG. 2 is a sectional view of a portion of the main conveyor diagrammatically illustrated in FIG. 1 for filtering the miscella at the outlet of the cooker.
Figure 3:
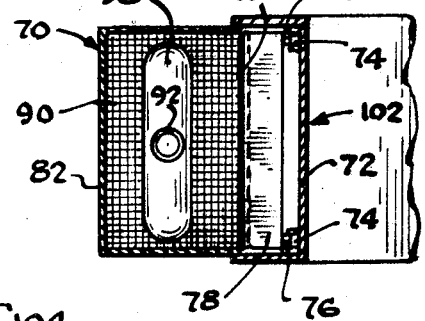
FIG. 3 is a sectional view taken along the line 3—3 of FIG. 2.

FIG. 2 is a sectional view of the filter 70 showing a portion of the leg 109 of the conveyor 102. The conveyor 102 is formed by a continuous tube having a generally rectangular cross section. The inner wall 72 of the tube carries a plurality of rollers 74 which translatably support a plurality of links 76 of a continuous chain. Each of the links 76 carries an L-shaped shoe 78 which catches solid particles passing through the opening 100 from the washer 58 and carries the solid particles through the leg 104 and the leg 106 of the conveyor 102 to deposit them in the outlet 108 in the leg 107 thereof.

As illustrated in FIG. 2, the conveyor 102 also has an outer wall 80, and the opening 112 which permits the slurry from the washer 58 to flow to the miscella tank 114 is disposed in this outer wall 80 of the leg 109 well below the level 61 of the slurry in the washer 58, the liquid level in the conveyor 102 being substantially the level 61. A rectangular fluid-tight box 82 is sealed about the perimeter of the opening 112, and the box 82 has a bottom 84 with an aperture 86 sealed to a tube 88 which communicates with the inlet of the miscella tank 114.

A screen 90 is sealed within the box 82 and disposed at an angle to the horizontal in order to filter large particles from the flow of miscella to the tank 114, and hence return the particles to the conveyor 102. It will be recognized that the flow of miscella and entrained particles in the leg 109 is counter to the direction of motion of the conveyor chain and links 78.

The miscella does contain some moisture and causes a glaze to develop and build on the screen 90, and unless some means is provided, the glaze will clog the screen, even if the perforations of the screen are very large. The present inventor has found that a 20 mesh screen will permit flow to the miscella by utilizing dry solvent vapors, such as the relatively dry vapors evaporated from the cooker 22, to keep the screen 90 clean. A tube 92 communicates with an outlet 94 in the head 20 of the cooker 22 and conducts the hot solvent vapors from the cooker 22 to a nozzle 96 confronting the side of the screen opposite the bottom 84 of the box 82. The vapor pressure from the secondary cooker is maintained at about 5 pounds per square inch. The flow of solvent vapors on the screen 90 has two separate functions. The flow of pressurized solvent vapor sweeps the screen clean and open and prevents clogging of any permit the miscella to flow through the screen. The flow of vapor also raises the temperature of any wet particles on the screen 90 to convert the gelatin adhering to the screen by drying into hard solid particles. The solid particles which fail to pass the screen 90 are swept back into the leg 109 of the conveyor 102, and the conveyor 102 drags the solid particles along the conveyor toward the discharge opening 108 thereof. In this manner, the screen 90 is maintained open for a free flow of miscella in accordance with the demands of the tank 114. The miscella in the tank 114 is highly concentrated in fat, and is pumped by a pump 116 through one of two filters 118 to a vacuum evaporator 120. The evaporator 120 evaporates the solvent from the miscella, and the fat is thereafter conducted through an oil stripper 122 to a fat storage tank 124.

Figure 4:
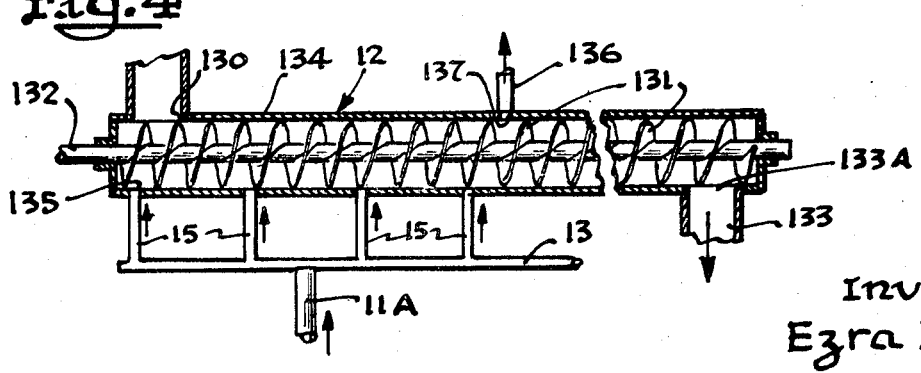
FIG. 4 is a longitudinal sectional view of the predryer and associated equipment of the apparatus and by which the initial water reduction is provided.

Referring to FIGS. 1 and 4, especially the latter, particles of high-moisture animal or fish tissue are introduced to the predryer 12 from the feed screw 10 through a port 130 in the predryer 12 at one end, moved through rotating flights 131 of screw 132 and passed out of an exit port 133A of the predryer 12 into conduit 133 that feeds particles to the disintegrator 14. The screw 132 is driven by a motor 132A which drives the tissue particles along the barrel 134 and causes the flights 131 to scrape the interior wall of the barrel. The steam introduced into the barrel 134 of the predryer by ports 135 in barrel 134, at which are connected pipes 15, is exhausted at a lower pressure, e.g., approximately atmospheric pressure, through exit pipe 136 connected at one end to barrel 134 at a port 137 in barrel 134. The port 137 is remote from ports 135, so that the steam must pass over the particles of biological substance.

The predryer 12 is an elongated screw conveyor, e.g., 1 foot in diameter and 40 feet long. Steam at about 100° C exiting by pipe can be passed to a reheater boiler which forms the source 11 in which part of the water is removed from the steam. Superheated steam from that boiler is fed to pipe 11A.

The superheated steam entering the barrel of the predryer 12 performs two functions. First, it heats the particles to their boiling point causing moisture in the particles to increase in vapor pressure and to be evacuated with the spent steam, thus drying the tissue in the barrel. The drying process, however, without loss of biological values, cannot be used to reduce the moisture content of animal or fish tissue below about 20 percent by weight, except by special means such as disclosed in the first full paragraph of page 28, because the tissue resists giving up water for lower moisture contents of the tissue, and the tissue must be permitted to retain moisture in order to limit the temperature of the particles to the boiling point of water and thus protect the biological values of the particles.

The second function of the predryer is to coagulate the albumen like protein of the particles, thus reducing the likelihood of agglomeration both in the predryer and in the cooker 22. For this purpose, the particles must be maintained at a temperature between 50° C and 100° C for a period of time. The period of time is generally less than 2 hours but may be as much as 10 hours, and the temperature of the steam from the source 11A and the paramaters of the barrel 134 must be selected for this purpose. It has been found with the barrel 134 described above, that steam at 350° C may be utilized for both purposes.

The following examples are intended to illustrate the process of the present invention and are not to be considered as limiting the invention to the exact materials or procedural conditions described.

Example 1. Beef offal from freshly killed animals is processed through the prebreaker 8, feedscrew 10, predryer 12, disintegrator 14, and injected in comminuted form continuously into the cooker 22 of the apparatus illustrated in FIGS. 1 through 4. The cooker is approximately 65 percent full of boiling ethylene dichloride. The pressure of the vapor within the vessel is substantially atmospheric. The heating coils 26 of the vessel supply sufficient heat to maintain boiling at a temperature of the boiling liquid of approximately 83° C. The vessel contains about 800 gallons of ethylene dichloride and the offal from the slaughter of 80 cattle per hour are introduced into the solvent each hour.

If a screw conveyor of short length is used in place of predryer 21 and low-pressure steam is introduced into that short screw conveyor, that steam heats the offal. However, no appreciable removal of water from the offal is effectuated. This is because the steam, saturated with moisture at the low pressure, is practically saturated at the pressure in the short screw conveyor. When using the short screw conveyor and the low-pressure steam, the process is that of my earlier copending application, now U.S. Pat. No. 3,538,973, mentioned above. In that case, with subsequent equipment and amount of solvent the same, the offal from the slaughter of only 70 cattle per hour is introduced.

A washer 58 identical to the cooker 22 in construction is used and contains a slurry of 800 gallons transferred from the cooker 22 to the washer 58. One hundred thirty-five pounds of offal per head of cattle are processed. Twenty-two and five/tenths percent of this offal is recovered in the form of solid particles, 22.5 percent recovered in the form of fat, and 55 percent removed in the form of water.

A suitable tenperature for the washer 58 operating under conditions of atmospheric pressure is approximately 70° C.

Example 2. Hog offal is processed in the same manner as beef offal by the apparatus of FIGS. 1 through 4. There are approximately 35 pounds of offal per hog of which 22.5 percent results in solid granular particles, 22.5 percent results in fat, and 55 percent water.

Example 3. Whole fish containing 60 to 70 percent moisture are cut up into large chunks. The chunks are treated with steam for 5 seconds and thereafter ground in the prebreaker 8 to particles of less than 0.5 inch diameter. Approximately 12,000 pounds of ground fish per hour are introduced into the apparatus described in Example 1 in this manner.

As in the case of Example 1, the process and apparatus, when modified to eliminate the partial drying in feedscrew 12 and to use a screw conveyor of short length and treatment of the fish with low-pressure steam in that conveyor, permits the processing of about 9,000 pounds of ground fish per hour.

It is apparent that the present process and apparatus provide a still higher throughput or introduction rate of such biological tissues having even higher water content than the rate for the process and apparatus described and claimed in my prior copending patent application mentioned above. For example, with fish containing about 80 percent water and partially dried by treatment with superheated steam, introduced at 350° C and exiting from predryer 12 at about 100° C, to lower the water content to about 40 percent, the rate is about double that when using the process and apparatus of my said copending application.

It is to be understood that the examples enumerated above can also be carried out with hexane, alcohol (isopropanol) and the other solvents enumerated above.

FIGS. 5A and 5B illustrate another embodiment of the present invention. In this embodiment, heated air is utilized to dry particles of animal tissue. As in the previous embodiment, the biological tissue is transformed into particles by means of a prebreaker 10, feedscrew 12 and a disintegrator 14. The particles are collected in a hopper 16 for feeding into the input of an air dryer designated 200. It will be noted that the prebreaker 10, feedscrew 12, disintegrator 14, and hopper 16 have been diagrammatically shown, since this apparatus is conventional and commercially available.

It is essential to the air dryer 200 that the tissue particles be coagulated prior to suspension in a moving mass of hot air, since the particles are sticky prior to coagulation and will agglomerate within the air dryer or adhere to the inner surfaces of the air dryer and render the air dryer inoperative. For this purpose, a coagulator 201 is interposed in the path of the particles between the screw 12 and the disintegrator 14. The coagulator 201 is in the form of a cylindrical vessel 203 with an opening 205 at the top in communication with the screw 12 to receive particles. The vessel 203 has a sloping bottom 206 with an outlet port 207 communicating with the disintegrator 14. A plurality of flights 209 affixed to the rotatable shaft 211 and driven by a motor 213 both stir the particles and urge the particles toward the outlet. Low pressure steam is introduced into the vessel at a port 215 and flows through the particles to exit at a port 217. The steam heats the particles to a temperature between 50° C and 100° C, and the particles remain in the vessel 203 for a period of time sufficient to coagulate the albumen like protein of the particles. This period of time has been found to be about 1 hour for fish and meat.

The air drying apparatus 200 utilizes an air heater or furnace 202 which receives air through an inlet port 204 from the ambient atmosphere and delivers air at an outlet port 206 at an elevated temperature. The inlet port 204 communicates with a blower 208 which is driven by a motor 210 through a drive belt 212. The blower 208 has an inlet opening 213 communicating with the ambient atmosphere and outlet tube 214 which extends to the furnace 202. An elongated substantially horizontal tube 218 is connected to the outlet port 206 of the furnace 202. The elongated tube 218 has a bend 220 communicating with an outwardly flaring conical chamber 222 which extends upwardly from the bend 220. The chamber 222 is connected by a downcomer 224 to a cyclone settling unit 226.

When the blower 208 is operating, a rapidly moving steam of air at ambient temperature flows from the blower 208 through the furnace 202, where it is heated, and through the elongated tube 218. The tube 218 is provided with a particle inlet orifice 228 near the input end of the tube 218 (adjacent to the furnace outlet port 206), and particles of raw tissue from the hopper 16 are introduced into the orifice 228 of the tube 218 through a metering lock 230. The particles are introduced through the lock 230 in sufficiently small quantities to permit the particles to become suspended in the flow of hot air in the tube 218, and to be carried along with the hot air in suspension. The particles move along the tube and around the bend 220 with the flow of hot air, and the particles then rise in the conical chamber 222 with the flow of hot air. The flowing air transports the particles, still in suspension, through the downcomer 224 and into the settling zone of the cyclone unit 226. In the cyclone unit 226, the particles are substantially separated from the air flow due to the reduced speed of the air flow in the cyclone unit, and the particles fall into a conical hopper 232 of the cyclone unit 226 and are permitted to exit from the cyclone unit through a lock 234 at the bottom of the hopper 232.

The cyclone unit 226 is provided with a central opening 236 at the top thereof, and the spent air from the cyclone unit is conducted by a tube 238 to the heater 202 for preheating the air from the blower 208, and hence exits to the atmosphere through a port 239.

The blower 208 must provide air with a sufficient velocity to maintain the particles in suspension. The particles may be held in suspension at flow rates of the order of 50 feet per second, or greater rates. The degree of air drying, however, is primarily a function of the period of time in which the particles are in the hot air stream and the temperature of the air itself. The larger particles tend to pass through the conical chamber 222 at a slower rate than the smaller particles, hence effecting increased drying of the larger particles. Since the larger particles are presumed to carry more moisture than the smaller particles, the end product delivered to the lock 234 is relatively uniform. Drying of the particles may be increased by lengthening the path the particles traverse in the air drying equipment, within practical considerations. The tube 218 in one particular construction has a square cross section 4 inches by 4 inches and a length of 8 feet. The bend 220 is approximately 5 feet 2 inches long and the conical chamber 222 is approximately 13 feet 11 inches in height. The furnace 202 delivers hot air to the tube 218 at a temperature of 600° F. The flow rate of the air through the tube 218 is 100 feet per second.

Example 4. In such a construction, raw ground fish may be fed through the lock 230 at a rate of seven and one half pounds per minute resulting in a decrease of moisture in the fish from approximately 64 percent to 52 percent. The air entering the furnace 202 through the return pipe 238 is at a temperature of approximately 240° F, and will exit through the outlet opening 239 from the furnace after preheating the air from the blower 213 at a temperature of approximately 100° F.

Fish and meat particles are sticky, and tend to stick to vessel walls and the like when dehydrated by the application of heat. Fish particles striking the walls of the tube 218, or the curve 220, tend to adhere to the surfaces of the tube and other conduit portions, and hence it is necessary that the particles be maintained substantially suspended in the flow of air through the tube 218, bend 220, conical chamber 222. A buildup of particles on the surfaces of these elements may be prevented and eliminated by introducing through the lock 230 some dried product which will in effect blast the adhering particles from the surfaces. Most animal tissue tends to get sticky and to adhere to surfaces when heat is applied, and this is particularly true of fish and meat. However, both of these products may be dehydrated in the manner set forth in the example above.

It will be noted in the foregoing example that the moisture content of the particles have been reduced from approximately 64 percent to approximately 52 percent. A moisture content in this range is far too great for storage and requires further dehydration. Nevertheless, for every 100 pounds of animal tissue, such as fish, the reduction in moisture content from 64 percent to 52 percent removes approximately 25 pounds of water from the material and requires the further processing equipment to receive only 75 pounds of material for further processing. The air flash drying system removes water less costly than a distillation system, and hence results in an economic advantage. In addition, the reduction in moisture content reduces the likelihood of agglomeration in further dehydration and defatting apparatus. Finally, if the moisture content is reduced below 20 percent, it is possible to defat the product in conventional solvent extraction apparatus, rather than utilizing the simultaneous distillation and defatting processes disclosed in my copending patents referred to above.

It is essential for the maintenance of the nutritional value of meat and fish that the temperature experienced by the particles in the air drying apparatus be maintained below a threshold value depending upon the end nutritional values desired. As long as a particle contains moisture, the temperature of the particle cannot exceed the boiling point of the moisture, namely approximately 100° C. If however, the particle becomes thoroughly dried, the particle will become hotter than 100° C and approach the temperature of the moving air mass, thus resulting in destruction of some of the nutritional properties of the particle.

It is possible to thoroughly dry animal tissue particles in the air drying apparatus illustrated in FIG. 5A, either by increasing the length of the tube 218, or by reintroducing the partially dried particles into the apparatus through the lock 230 one or more additional times to reduce the moisture content in the particles to approximately 20 percent or less to permit solvent extraction. When such particles appear in the hopper 232 of the cyclone unit 226, they may be dropped directly through the lock 234 to an extractor unit 240 through a tube 242. The tube 242 communicates with an opening 244 in a vessel 246 to permit the particles to drop into a body 248 of solvent. A heater 250 in the body of solvent maintains the temperature at approximately 80° C for efficient fat extraction.

The extractor 240 illustrated in FIG. 5A is preferably operated as an azeotropic distillation extractor. A substantially water-immiscible fat solvent, such as ethylene dichloride, or the solvents previously referred to, is utilized for the body 248 of solvent which partially fills the vessel 246, the liquid level being indicated at 252. The heater 250 maintains the body 248 of solvent under rapidly boiling conditions, the vapor passing from the region above the liquid level 252 through an outlet port 254 in a manner similar to that illustrated for the vessel 22 of FIG. 1. The partially dried particles entering through the port 244 become mixed in the solvent body 248, and when substantially dry fall in the solvent to the bottom of the vessel 246. An outlet port 256 at the bottom of the vessel 246 permits the particles to enter a conveyor 258 of the continuous type.

The conveyor 258 is of conventional construction, and carries the particles through the liquid tight housing 260 to a level above the liquid level 252 to deposit the particles in a washer 262 through an inlet port 264 thereof. Oil from the cooker 240 flows against the shoes of the conveyor 258 in the upper portion of the conveyor, which is sealed from the lower portion of the conveyor by a partition 265, and the oil rises in a standpipe 266 communicating with the housing 260 to a miscella outlet port 268 located at the liquid level 252 in the standpipe 266. The miscella thus withdrawn through the port 268 is then separated into solvent and fat in the manner of the embodiment of FIG. 1. The solvent thus separated, and fresh solvent, is utilized to maintain the liquid level 252 and enters the vessel 246 through an inlet port 270.

The washer 262 is of similar construction to the conveyor 258, the washer 262 also contains a conveyor which moves the particles entering through the port 264 through a fluid tight housing 272. The housing 272, like the housing 260, has a rising leg 274, and the particles are raised by the conveyor into the leg 274 to deposit the particles through outlet opening 276 which communicates with a second washer 278. The second washer 278 is of similar construction to the first washer 262, and has an outlet port 280. A conveyor 282 in the second washer 278 elevates meal deposited through the port 276 to the outlet port for subsequent deodorizing as described in connection with the embodiment of FIG. 1.

It will be noted that fresh solvent is introduced through an inlet port 284 in the second washer 278 and flows countercurrent through the second washer 278. The level of the slurry formed by the fresh solvent, meal, and fat is maintained below the port 280 and indicated at 286. Miscella is drawn from the housing of the second washer 278 through a port 288 located below the level 286, and introduced by means of a pump 290 into the first washer 262 through a port 292 located below the outlet port 276 thereof. The miscella from the second washer 278 forms a body with the liquid level 294. Miscella from the first washer is likewise withdrawn through a port 296 below the level 294 and pumped by a pump 298 to an inlet port 300 in the conveyor housing 260 below the opening 264.

Example 5. A fish meal plant with a 200 ton per day input capacity constructed as disclosed in application Ser. No. 408,231, now U.S. Pat. No. 3,538,973, will produce about 38 tons of fish meal at 7 percent by weight moisture. Fish meal may be produced in the apparatus of FIG. 5A, dimensioned as set forth above, by predrying 10,500 pounds per hour of water from the raw fish. To accomplish this, the temperature of the hot air from the boiler 202 is approximately 900° F. and the rate of flow through the tube 218, which is 36 inches in diameter, is 96 feet per second. The dryer uses approximately 40,000 cubic feet of air per minute and is driven by a 200 horsepower motor 210. The cooker 240, operating with ethylene dichloride solvent 248 as an azeotropic distillery, produces 50 tons per day of fish meal under these conditions of 7 percent moisture. Removal of the solvent in the desolventizers, by a process similar to that shown with reference to FIG. 1, will further reduce the moisture content of the meal to a desired level.

Hence, the use of the dryer 200 increases the production by at least 12 tons per day, or approximately 32 percent. Approximately the same results can be achieved producing meat meal from scrap meat by-products or muscle.

Example 6. The process of the present invention may also be utilized to precede an isopropanol extraction of low fat fish meal, such as hake. 1,000 grams of ground whole hake was dried by means of blowing hot air across the surface of the hake. When 600 rams of water had been dried off by this means, the partially dried hake was suspended in 2,200 milliliters of 91 percent ispropanol maintained at a temperature of 60° C and stirred for a period of 50 minutes. At the end of this time the material was again centrifuged, air dried, and the solvent extracted. The hake originally contained 650 grams of water, 150 grams of meal, and 200 grams of oil. The predrying with hot air reduced the product before extraction to 50 grams of water, 150 grams of meal, and 200 grams of oil, thus reducing the water content to approximately 12 percent by weight. Without removal of water prior to extraction, it was found that a third suspension of the wet hake in isopropanol was required to achieve a similar result. It is thus clear that the use of predrying prior to extraction materially shortened the extraction process and reduced the cost thereof.

Example 7. Fish meal may be predried in the apparatus of FIG. 5A, dimensioned as set forth above, by drying in the manner of Example 5. The fish particles through the air dryer 200 three times, the particles being removed from the hopper 232 and cooled to approximately room temperature after the first and second pass through the air dryer. After the third pass through the air dryer, the particles have a moisture content less than 20 percent, and are transmitted through the tube 242 to the extractor unit 240. A body of ethylene dichloride solvent 248 at a temperature of approximately 75° C and atmospheric pressure extracts the fat in the particles to produce a fish meal of approximately 4 percent fat and 7 percent moisture.

Those skilled in the art will readily devise many modifications of the present inventive process within the intended scope thereof. It is therefore intended that the scope of this invention be not limited by the foregoing disclosure, but rather only by the appended claims.

The embodiments of the invention in which an exclusive property or privilege is claimed are defined as follows:

1. The proces of separating fat from meat or fish containing a substantial moisture content comprising the steps of converting said meat or fish into particles, contacting the particles in a zone with a stream of a gas fed to the zone at a temperature greater than the boiling point of the moisture content of the particles for a period of time no greater than the time required to evaporate said moisture content of the particles, introducing said particles of the lower moisture content into a body of fat solvent to extract the fat from the particles to form a slurry of particles, fat and solvent, separating the particles from the slurry, and separating the solvent from the fat.

2. The process of claim 1 wherein the particles are coagulated prior to contacting the particles with a stream of gas by subjecting the particles to heat for a period of time sufficient to achieve coagulation.

3. The process of claim 1 wherein the solvent is a water-immiscible fat solvent which is at an elevated temperature and which forms an azeotrope with water to form a slurry composed of the particles and liquid in combination with the steps of maintaining boiling of the liquid component of the slurry to remove an azeotropic vapor composition of solvent and water until the moisture content of the particles is lowered to the extent that the particles are substantially defatted and substantially dehydrated.

4. The process of claim 1 wherein the gas is superheated steam and the contact with the particles of meat or fish is at the gaseous pressure and temperature of the superheated steam.

5. The process of claim 4 wherein the temperature of the superheated steam fed to the zone is about 350° C and the steam is exhausted from the zone at about atmospheric pressure.

6. The process of claim 1 wherein the gas is superheated steam and the contact with the particles of the meat or fish is in a zone at a gaseous pressure substantially less than the normal pressure of the superheated steam at the temperature at which it is fed to the zone.

7. The process of claim 1 wherein the particles of meat or fish have a water content of more than 60 percent by weight of the particles.

8. The process of claim 2 wherein the gas is hot air.

9. The process of claim 8 wherein the particles are suspended in the stream of hot air and transported therein for a period of time no greater than the time required to evaporate said moisture content of the particles.

10. The process of claim 9 wherein the maximum temperature of the air stream is between 400° and 900° Fahrenheit, and said air stream flows at a rate of 40 to 100 feet per second.

11. In the process of removing water and fat from meat or fish having a substantial content of water and fat in which the meat or fish substance is converted into particles, the particles are introduced into a body of fat solvent which forms an azeotrope with water, the mixture is subjected to a distillation to remove azeotrope vapors containing water from the particles of meat or fish, and the particles are extracted with fat solvent to remove fat, the improvement in which the meat or fish as particles and before being introduced into the body of fat solvent is contacted with a stream of gas for a period of time, the temperature of said gas being above the boiling point at the prevailing pressure and the period of time being no longer than necessary to remove the moisture from the particles.

12. The process of claim 11 wherein the meat and fish particles containing protein coagulated by heat at 60°–100° C are heated at a temperature between 60° C and 100° C for a period of time sufficient to coagulate the said protein therein prior to contacting the particles with the stream of gas at a temperature above the boiling point.

13. The process of claim 12 wherein the gas is superheated steam and the contact with the particles of fish or meat is in said contact zone at a gaseous pressure of the superheated steam at the temperature at which it is fed into said zone.

14. The process of claim 13 wherein the substance to be extracted from fat is fish with a water content of more than 60 percent by weight of the fish, and wherein the temperature of the superheated steam fed to the zone is about 350° C and the steam is exhausted from the zone at about atmospheric pressure.

15. The process of claim 11 wherein the gas is hot air at a temperature above the boiling point of water.

16. The process of claim 15 wherein the particles are suspended in the stream of hot air and transported therein.

17. The process of claim 16 wherein the maximum temperature of the air stream is between 400° and 900° Fahrenheit, and said air stream flows at a rate of 40 to 100 feet per second.

18. The process of separating fat from a meat or fish substance having a substantial moisture content above 20 percent by weight comprising the steps of converting said substance into particles, heating said particles at a temperature between 50° C. and 100° C. for a period of time sufficient to coagulate the albumen-like protein of the particles, agitating the particles during said heating step to prevent agglomeration of the particles, heating a mass of air to a temperature between 400° F. and 900° F., propelling said mass of air through a conduit from a source region to a settling region at a rate between 40 feet per second and 100 feet per second, after coagulating the particles introducing the particles into the conduit adjacent to the source region, maintaining the particles in the conduit for a time sufficient to reduce the moisture content to not more than 20 percent by weight, thereafter transporting said particles from the settling region and introducing said particles in a stream into a vessel containing a body of fat solvent to extract the fat from the particles, removing particles from the vessel, withdrawing fat and solvent from the vessel, filtering the fat and solvent, withdrawn from the vessel and separating the fat from the solvent, separating the solvent from the particles removed from the vessel, and reducing the moisture content of the particles removed from the vessel.

19. The process of claim 18 wherein the particles are introduced into the conduit in successive batches.

20. The process of claim 18 wherein the solvent is maintained at a temperature below its boiling point.

21. The process of claim 20 wherein the solvent is alcohol.

22. The process of claim 18 wherein the solvent is a water-immiscible fat solvent which forms an azeotrope with water and is maintained under boiling conditions.

* * * * *

PO-1050
(5/69)

UNITED STATES PATENT OFFICE
CERTIFICATE OF CORRECTION

Patent No. 3,742,001          Dated June 26, 1973

Inventor(s) Ezra Levin

It is certified that error appears in the above-identified patent and that said Letters Patent are hereby corrected as shown below:

Column 3, line 48, after "particles" insert --. The time of contact of the gas and particles--

Column 8, line 61, after "any" insert --kind to--

Column 11, line 52, delete "steam" and insert --stream--

Column 12, line 38 after "decrease" delete "of" and insert --in--

Column 15, line 18, after "particles" insert --pass--.

Signed and sealed this 22nd day of January 1974.

(SEAL)
Attest:

EDWARD M. FLETCHER, JR.          RENE D. TEGTMEYER
Attesting Officer          Acting Commissioner of Patents